Nov. 20, 1928.
J. W. BISHOP
1,692,796
AUTOMATIC PIN SETTING MACHINE
Filed April 2, 1925
11 Sheets-Sheet 1
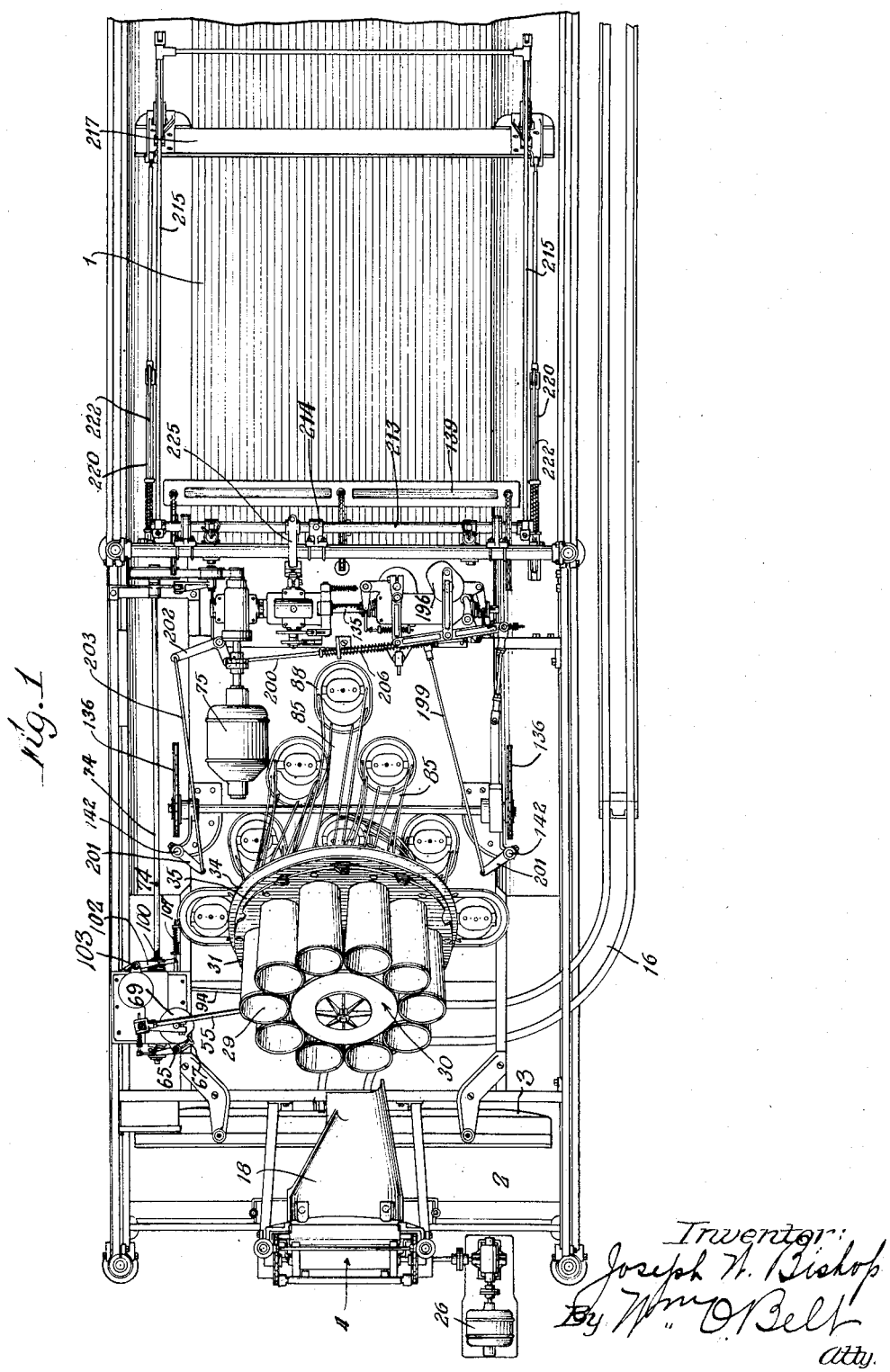

Nov. 20, 1928.
J. W. BISHOP
AUTOMATIC PIN SETTING MACHINE
Filed April 2, 1925
1,692,796
11 Sheets-Sheet 2
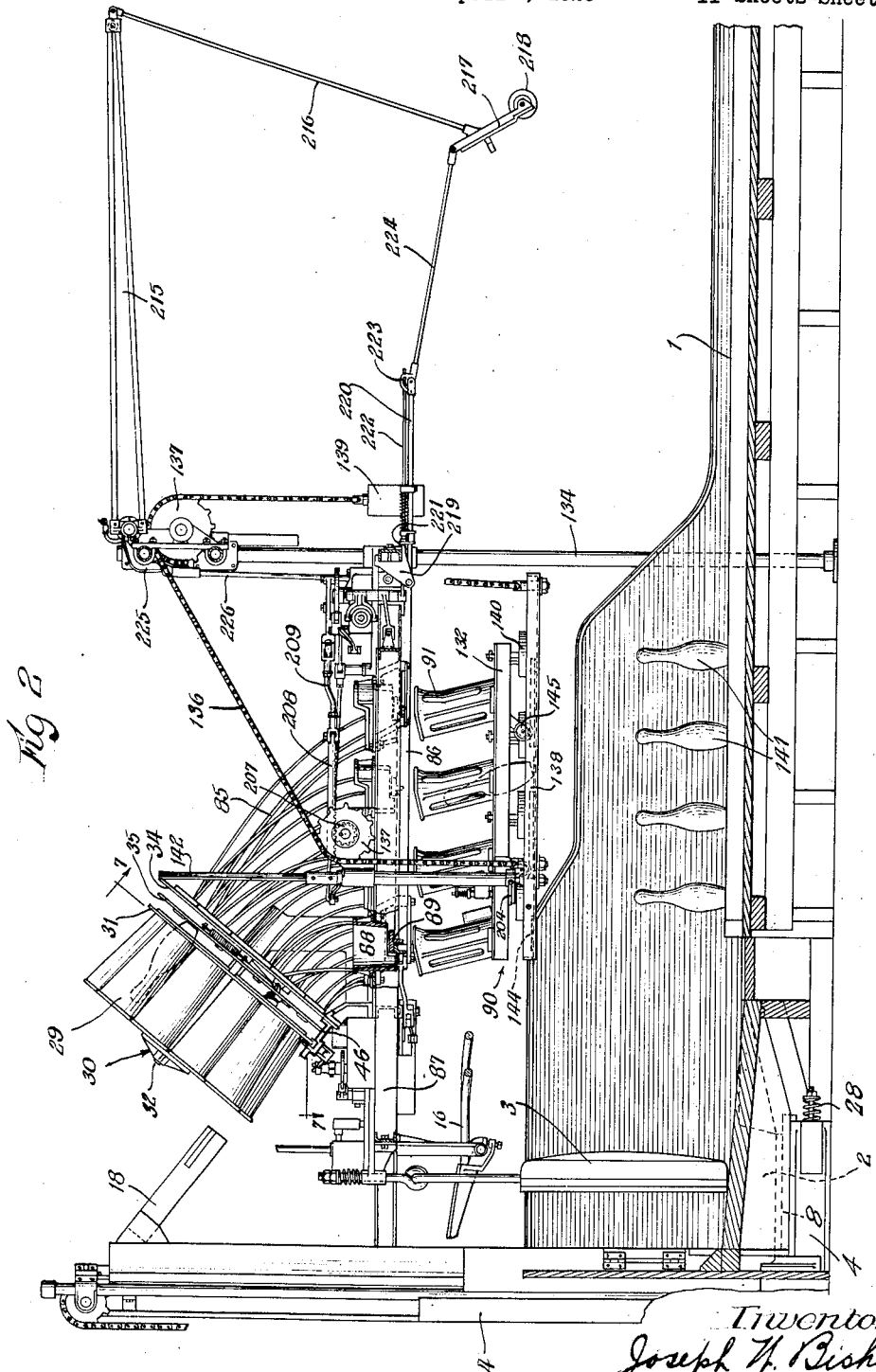

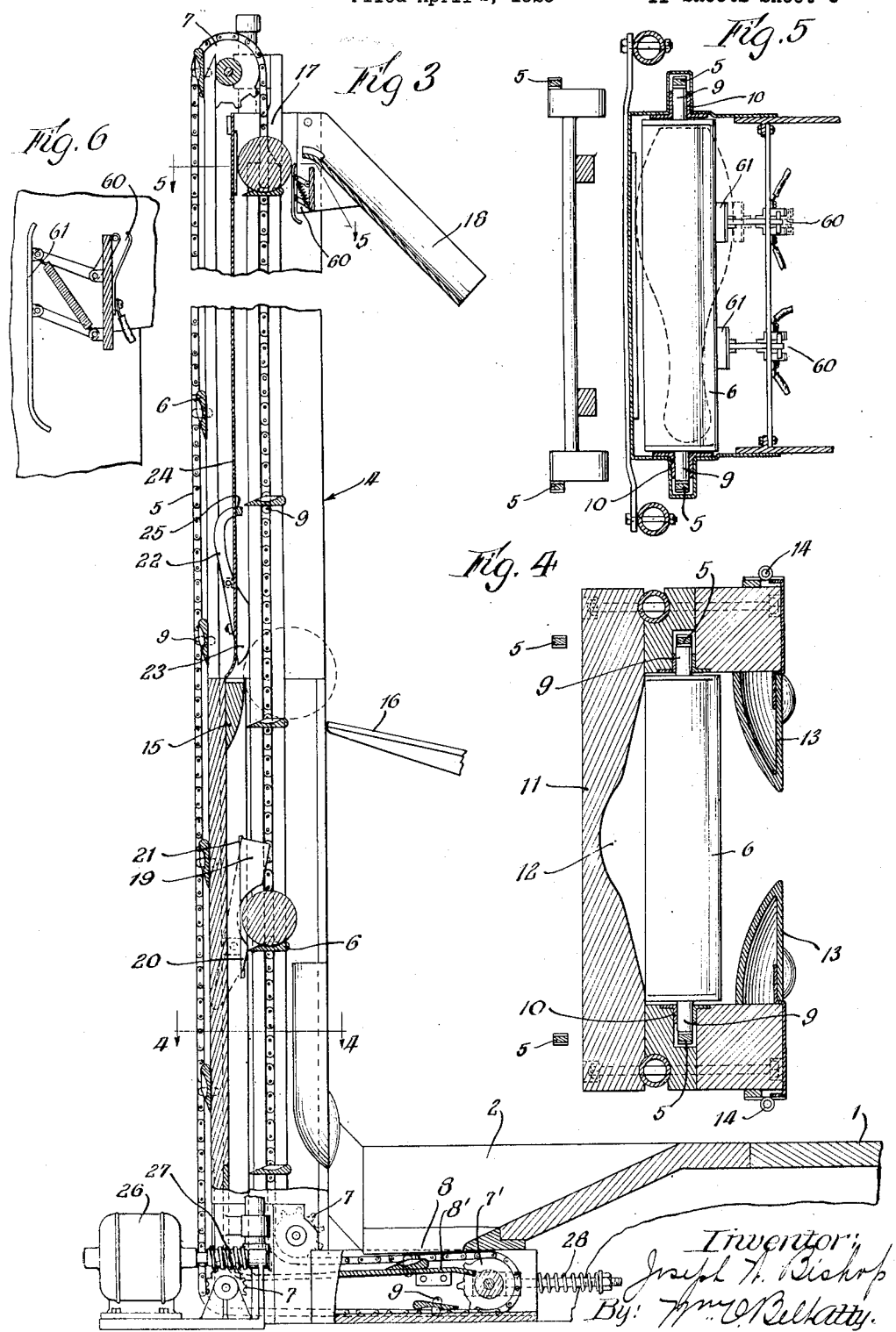

Nov. 20, 1928.
J. W. BISHOP
1,692,796
AUTOMATIC PIN SETTING MACHINE
Filed April 2, 1925 11 Sheets-Sheet 4
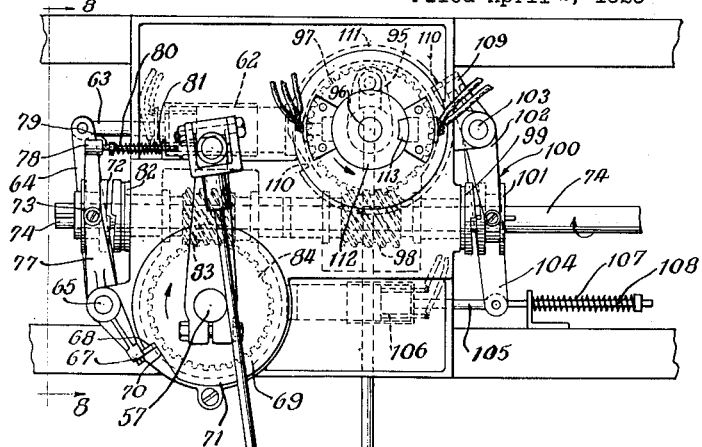
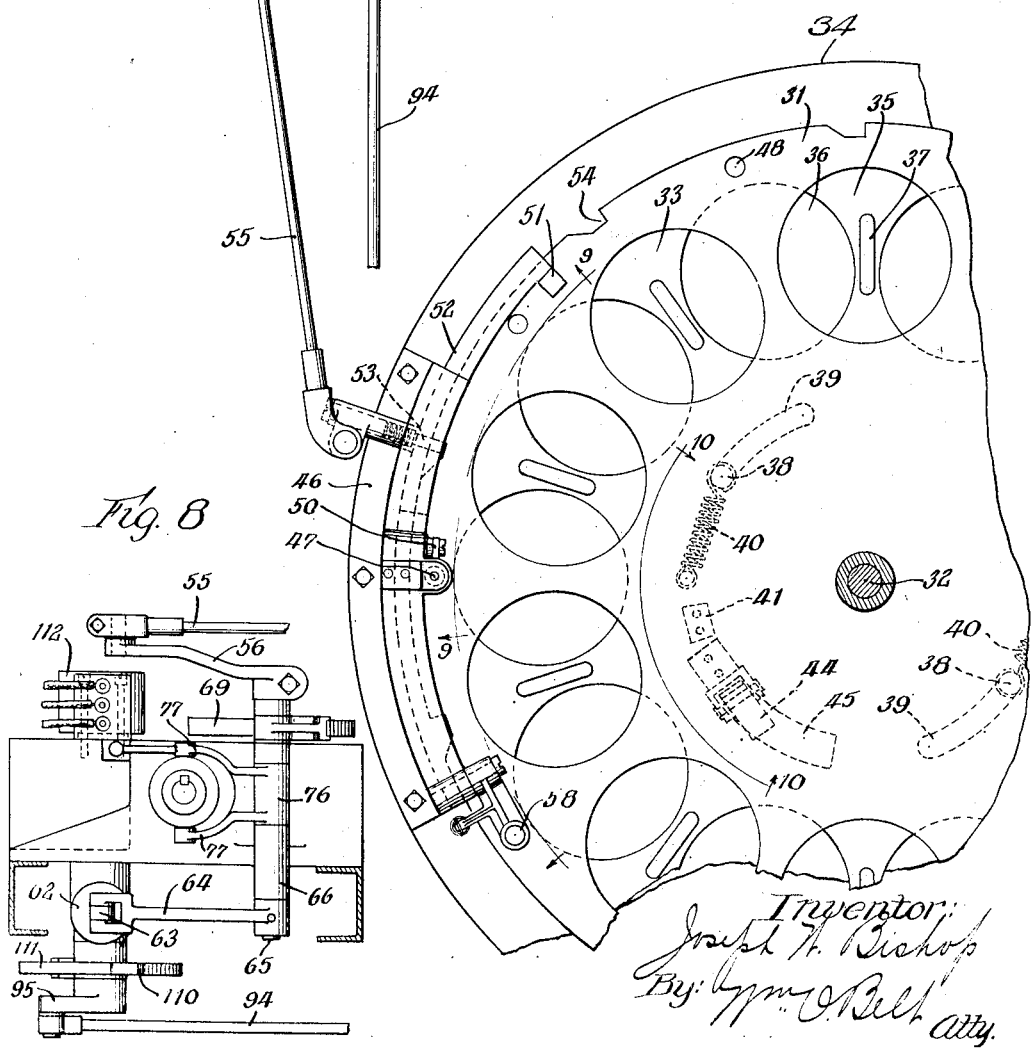

Nov. 20, 1928.

J. W. BISHOP 1,692,796

AUTOMATIC PIN SETTING MACHINE

Filed April 2, 1925     11 Sheets-Sheet 5

Inventor:
Joseph W. Bishop
By: [signature] Atty.

Nov. 20, 1928.

J. W. BISHOP 1,692,796

AUTOMATIC PIN SETTING MACHINE

Filed April 2, 1925   11 Sheets-Sheet 6

Inventor
Joseph W. Bishop
By: [signature]
Atty.

Nov. 20, 1928.
J. W. BISHOP
1,692,796
AUTOMATIC PIN SETTING MACHINE
Filed April 2, 1925 11 Sheets-Sheet 7
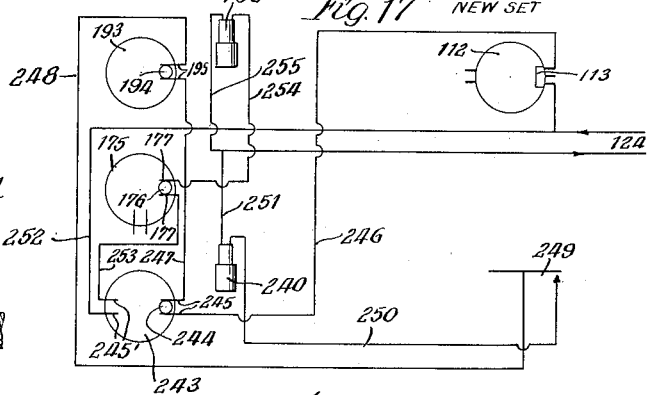
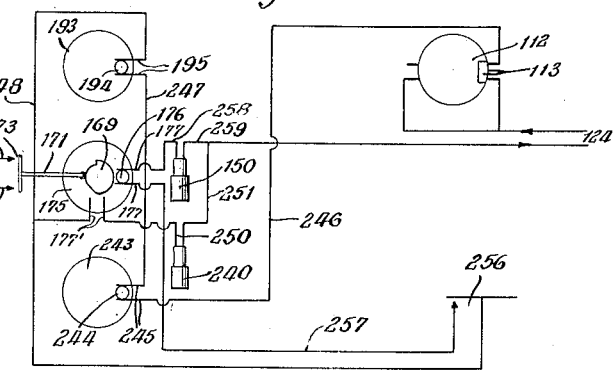
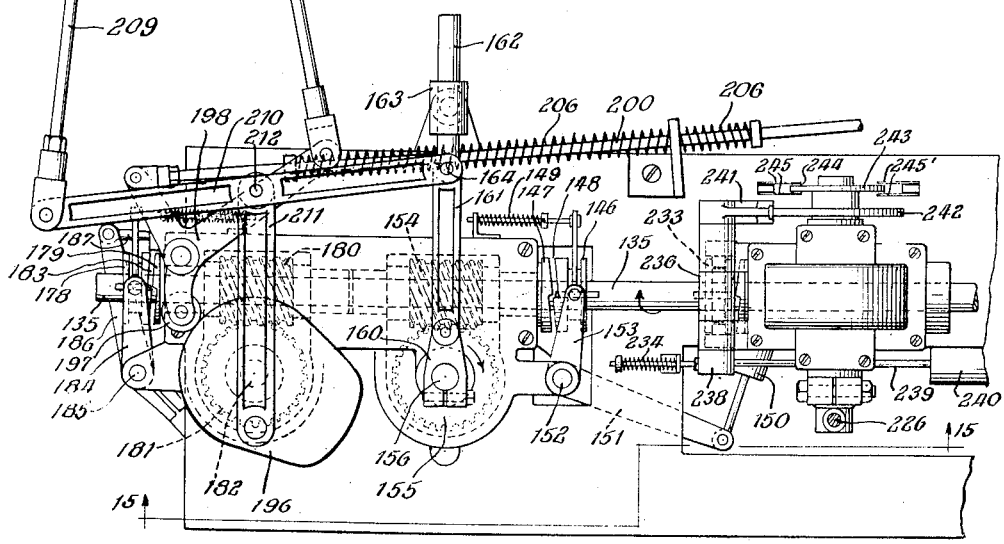

Nov. 20, 1928.  
J. W. BISHOP  
1,692,796  
AUTOMATIC PIN SETTING MACHINE  
Filed April 2, 1925   11 Sheets-Sheet 8
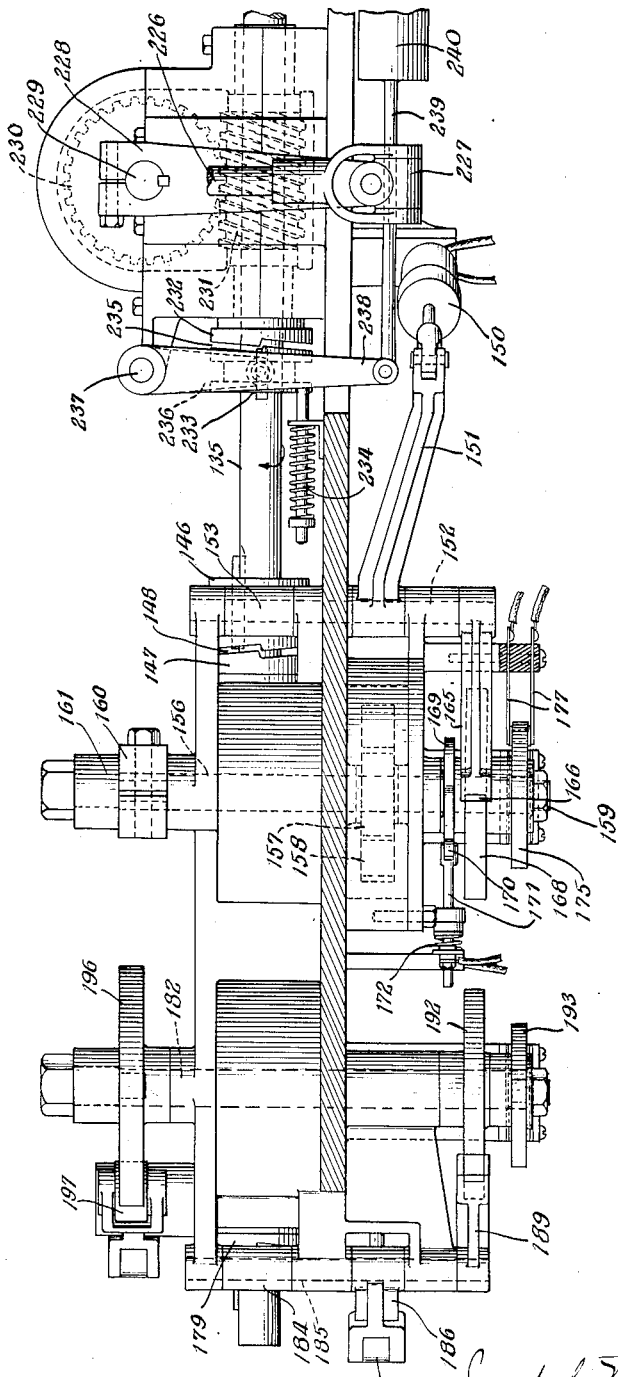

Nov. 20, 1928.
J. W. BISHOP
1,692,796
AUTOMATIC PIN SETTING MACHINE
Filed April 2, 1925  11 Sheets-Sheet 9
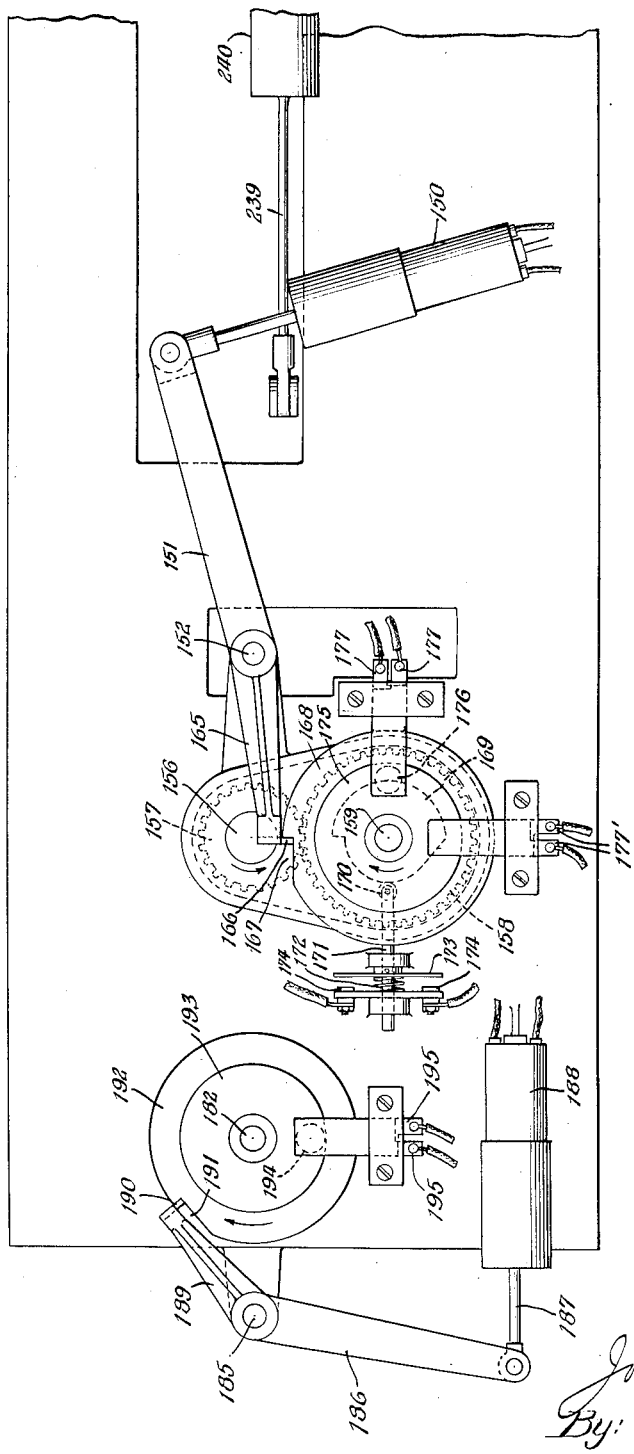

Nov. 20, 1928.
J. W. BISHOP
1,692,796
AUTOMATIC PIN SETTING MACHINE
Filed April 2, 1925  11 Sheets-Sheet 10
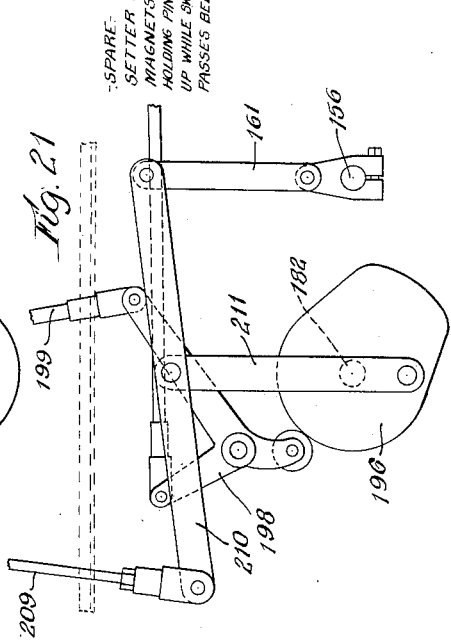
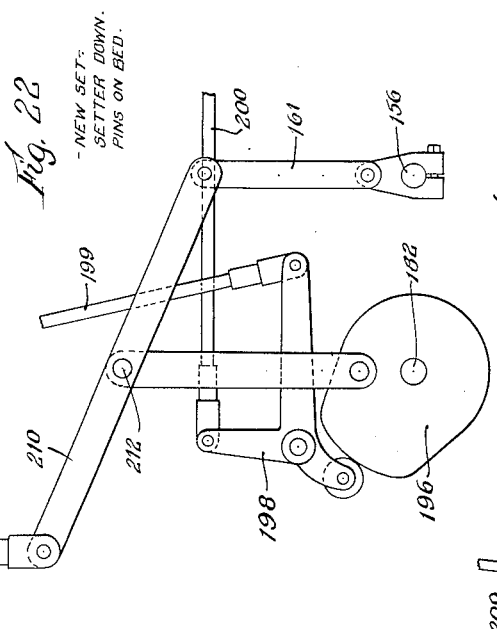
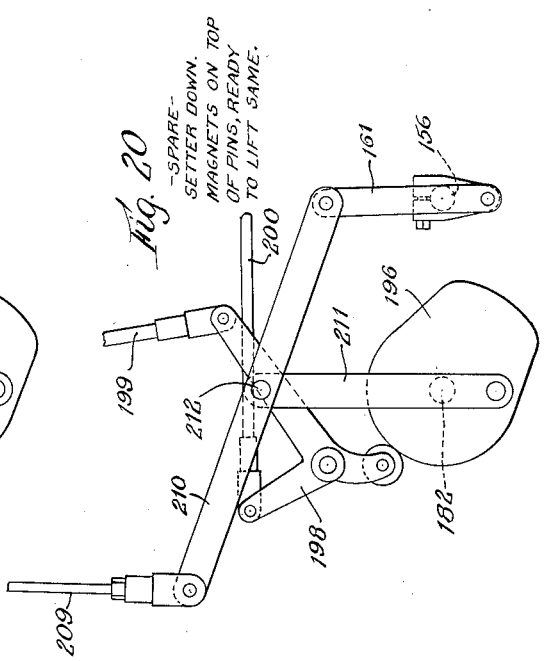
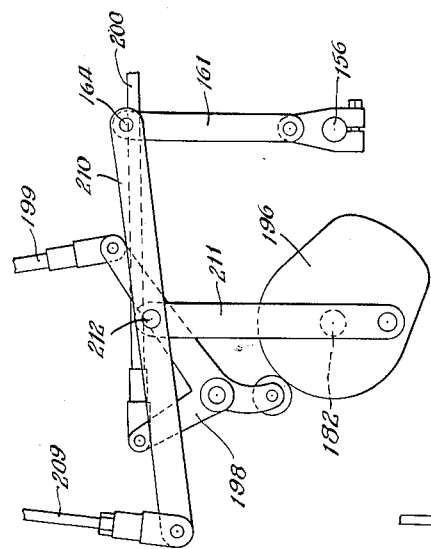

Nov. 20, 1928.
J. W. BISHOP
1,692,796
AUTOMATIC PIN SETTING MACHINE
Filed April 2, 1925   11 Sheets-Sheet 11
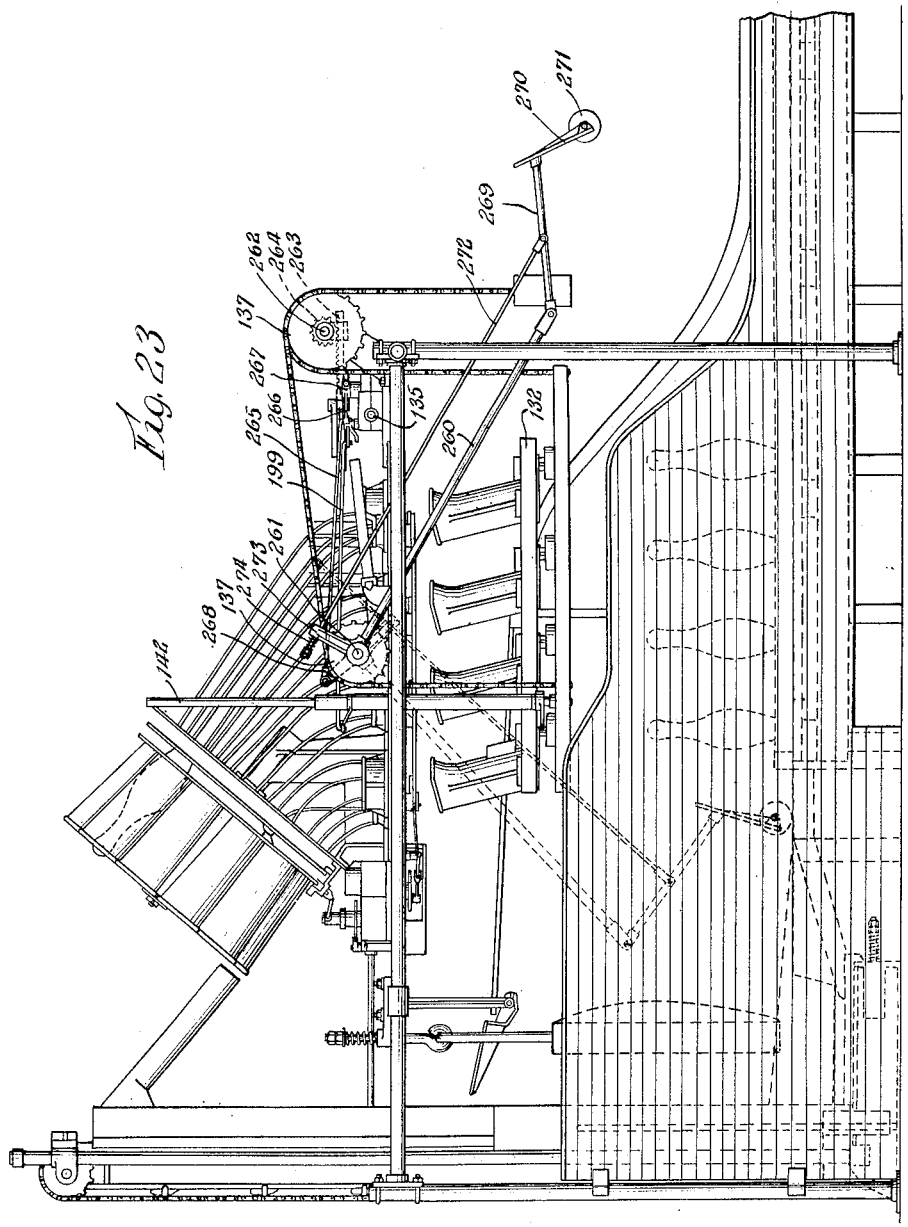

Patented Nov. 20, 1928.

1,692,796

UNITED STATES PATENT OFFICE.

JOSEPH W. BISHOP, OF MUSKEGON, MICHIGAN, ASSIGNOR TO THE BRUNSWICK-BALKE-COLLENDER COMPANY, OF WILMINGTON, DELAWARE, A CORPORATION OF DELAWARE.

AUTOMATIC PIN-SETTING MACHINE.

Application filed April 2, 1925. Serial No. 20,093.

This invention relates to automatic machines for setting pins on bowling alleys and for performing all the other operations usually performed by a pin boy.

Such machines must be capable of sweeping the alley clear of "dead wood", resetting the pins that have been swept from the alley, returning the balls to the player's end of the alley, and temporarily removing the standing pins after there has been a spare so as to enable the sweep to operate.

It is therefore the primary object of my invention to provide a machine which will perform the above functions in a thoroughly efficient manner and yet which will be of as simple a character as is possible.

A further object of the invention is to provide novel and improved means for handling the pins and balls, to return the balls to the player's end of the alley and to distribute the pins to proper position for setting upon the alley.

Still another object of the invention is to provide novel and improved means for controlling the sweep and the setter employed for spotting the pins.

A further object of the invention is to provide a compact arrangement of mechanism wherein the sweep, instead of projecting forwardly over the alley as has been customary in the past, will be contained within the confines of the other mechanism, thus making a far more sightly and more efficient arrangement.

A still further object is to provide an improved and simplified system of controls for the mechanisms which perform the various operations and one which will be entirely automatic in operation.

Further objects and advantages of the invention reside in the various combinations hereinafter described and claimed and will be better understood by reference to the following specification when read in connection with the accompanying drawings illustrating preferred embodiments thereof, and in which:

Fig. 1 is a plan view of the machine as applied to a bowling alley.

Fig. 2 is a side elevation of the device shown in Fig. 1.

Fig. 3 is a longitudinal section through the center of the elevator shown at the left of Figs. 1 and 2.

Fig. 4 is a section on the line 4—4 of Fig. 3.

Fig. 5 is a section on the line 5—5 of Fig. 3.

Fig. 6 is a detail of one of the contacts arranged at the top of the elevator.

Fig. 7 is a view taken on the line 7—7 of Fig. 2, the containers of the distributor being omitted for the sake of clearness.

Fig. 8 is a section on the line 8—8 of Fig. 7.

Fig. 14 is an enlarged plan view of a portion of the mechanism as shown in Fig. 1, certain parts being omitted for the sake of clearness.

Fig. 15 is a section on the line 15—15 of Fig. 14.

Fig. 16 is a bottom plan view of the structure shown in Fig. 15.

Fig. 17 is a wiring diagram showing the means for controlling the portion of the apparatus shown in Figs. 14, 15 and 16 which is used when a new set of pins is to be placed in position.

Fig. 18 is a wiring diagram showing the means for controlling the portion of the apparatus shown in Figs. 14, 15 and 16 which is used in case of a spare.

Figs. 19, 20, 21 and 22 are views of certain of the elements shown in Fig. 14, in the different positions which they occupy.

Fig. 23 is a view similar to Fig. 2 but showing a modified arrangement of the sweep.

Figure 9:
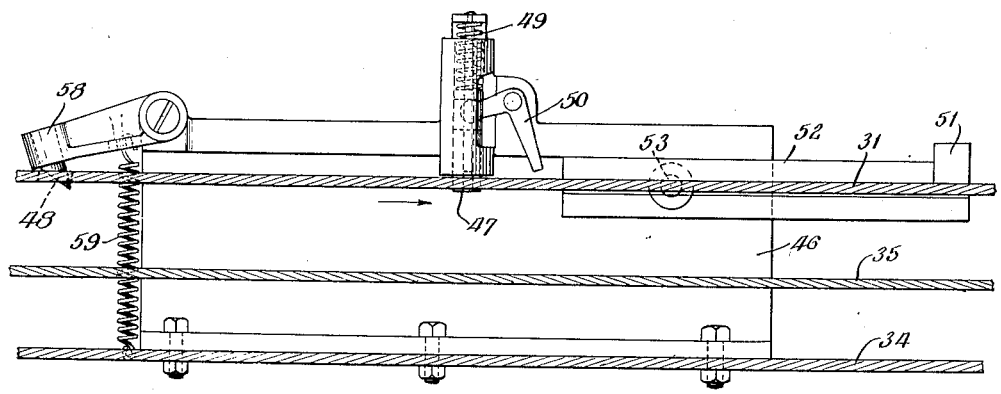
Fig. 9 is a section on the line 9—9 of Fig. 7.
Figure 10:
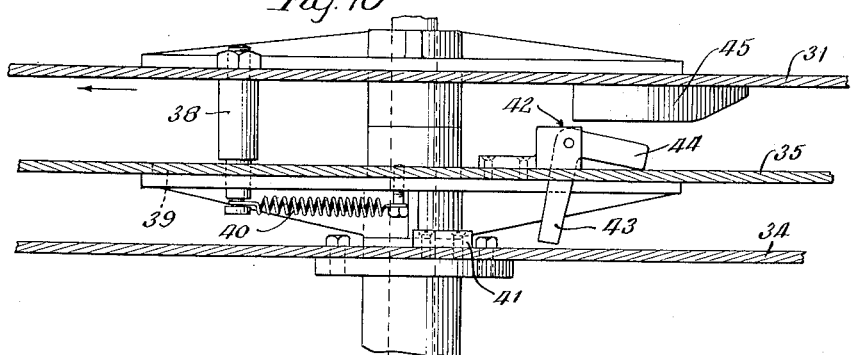
Fig. 10 is a section on the line 10—10 of Fig. 7.

Referring now to the drawings and particularly to Figs. 1 to 5 inclusive, the numeral 1 designates the bed of a bowling alley terminating in a pit 2. Disposed adjacent the end of the pit and behind the cushion 3 is an elevator 4 comprising flexible elements such as chains 5 carrying a plurality of buckets 6 and trained over suitable sprockets 7 and in such a manner that a portion thereof will extend horizontally and beneath an opening 8 in the bottom of the pit. By this arrangement either balls or pins which are knocked or swept into the pit, may be engaged by the buckets and carried upwardly by the elevator to the point where it is desired to discharge them.

Each bucket is rigidly secured to a lug 9 pivoted to the chains and normally extending at right angles thereto as shown on the downward reach of the elevator at the left of Fig. 3. As the chains, however, turn upwardly the lugs 9 enter channels formed between angles 10 in the sides of the elevator and thereby are swung to a position parallel to the chains and such that the buckets will be maintained at right angles to the chains, or in a horizontal position as plainly shown in Fig. 3. It will be noted that the buckets are also in a horizontal position when passing beneath the bottom of the pit, being maintained in that position by contact with a horizontal plate 8'. The buckets are so shaped as to carry either pins or balls and the back 11 of the elevator is provided with an arcuate recess 12 therein so that a ball received upon a bucket will be forced towards the middle thereof. This placing of the ball is aided by the guides 13 pivoted on spring hinges 14 on the sides of the elevator. Said guides also aid in directing a pin into position so that it will lie lengthwise of the bucket, occupying some such position as that shown in dotted lines in Fig. 5.

As the elevator travels on its upward path any balls contained in the buckets are displaced by the projection 15 secured to the back of the levator and disposed in the recess 12, and the ball is received on the track 16, which carries it back to the other end of the alley. As the buckets reach the top of the elevator, the lugs leave the channel in which they have been riding, thus permitting the buckets to tip, tipping of the buckets being insured by engagement of a cam 17 with the front edges thereof. The pins carried by the buckets are thus displaced, and pass down the pin chute 18. It is, of course, understood that the projection 15 permits the passage of pins, but not of balls. The pin chute is of a shape such that a pin sliding down the same will leave the lower end thereof bottom side down.

It sometimes happened that a bucket will pick up more than one pin and it is necessary to the successful operation of the machine that only one pin at a time shall be discharged down the chute. I therefore provide means to displace an additional pin which may be carried by a bucket. In Fig. 3 I have shown one of a pair of pivoted members 19 supported by the back of the elevator and so arranged that its upper end will project into the path of travel of the pins on the buckets. The upper end may be forced back by a pin in a bucket sufficiently to insure passage of that pin. But if another pin is riding on top of the pin in the bucket, it must be riding against the back of the elevator and will be therefore forced forwardly by the pivoted member 19 and will fall forwardly into the pit. As plainly shown in Fig. 3 backward movement of the member 19 about its pivot is limited by engagement of the lower portion 20 with the rear of the bucket 6 until the bucket comes opposite the recess therein. These pivoted members may conveniently be mounted in slots 21, one on either side of the central recess 12, so as to dislodge a pin either way that it may be resting in a bucket. To further insure that no more than one pin shall reach the top of the elevator at one time, I provide a safety displacer in the form of members 22 pivoted above the projection 15 and having lower portions 23 normally in the line of travel of pins carried by the buckets. These members are pivoted on the sides of the elevator and the lower portions 23 thereof project through the sheet metal plate 24 forming the upper part of the back of the elevator. The upper ends of the members 22 project forwardly through the plate 24 and are connected by a cross bar 25. By this arrangement the enlarged end of a pin will engage the lower portion 23 of one of the members 22 and force the bar 25 forwardly. If only one pin is on the bucket, it will force the bar 25 back when it strikes the same and the lower portion 23 will then project forwardly again. However, if there are two pins on a bucket, this forward movement of the lower portion 23 will be prevented by engagement of the bucket with the lower portion, and the upper pin will be displaced by the bar 25.

The elevator is operated by the motor 26 mounted upon the base of the machine and operatively connected to one of the sprockets 7 by suitable gearing 27. The horizontal portion of the elevator is maintained under proper tension by mounting the sprockets 7' in a slidable journal tensioned by a spring 28.

As the pins are discharged one at a time from the bottom of the pin chute, they are received in compartments or containers 29, usually ten in number, mounted in a circle on the distributor 30. The details of this distributor are shown in Figs. 1, 2 and 7 to 11 inclusive. The distributor comprises the compartments or containers 29 mounted upon the top plate 31 which is revolvably supported on the pivot 32, and is provided with a plurality of holes 33 at the bottoms of the compartments 29 and of a size permitting a pin in a compartment to pass freely therethrough. Fixedly secured to the pivot 32 is the bottom plate 34 having holes therein in alignment with the holes in the intermediate plate 35 so that pins may pass through the compartments and through both top and bottom plates, when the distributor has received the full quota of pins. To prevent discharge of the pins from the distributor until all the compartments therein are occupied by pins I provide the intermediate plate 35 revolvably mounted on the pivot 32 and having the same number of holes as the top plate. By reference to Fig. 7, it will be seen that the holes 36 in the intermediate plate are staggered in relation to the holes in the top plate and rubber bumpers 37 are provided between the holes in the intermediate plate on which may rest the pins projecting through the holes in the top plate.

Referring now more particularly to Figs. 7 to 11 inclusive, it will be seen that the top and intermediate plates are rotated together by means of a plurality of pins 38 secured in the top plate and movable in slots 39 in the intermediate plate. The lower ends of the pins 38 are provided with springs 40 secured to the intermediate plate whereby under ordinary conditions the rotation of the top plate will cause rotation of the intermediate plate, the strength of the springs 40 being sufficient for this purpose and not permitting any substantial movement of one plate relative to the other. Secured to the bottom plate 34 is a stop 41 and secured to the top of the intermediate plate 35 is a bell crank lever 42 having one arm 43 passing through a slot in the intermediate plate and projecting into position to be engaged by the stop 41, and having an upper arm 44 adapted to come into engagement with the cam 45 mounted on the under side of the top plate 31 for a purpose which will presently appear.

Movement of the distributor is governed by means now to be described. Mounted on the bottom plate 34 is a standard 46 which projects above the top plate, as plainly shown in Figs. 7 and 9, and which slidably supports a lock 47 adapted to enter any one of a plurality of holes 48 spaced centrally between the holes 33 to hold the top plate against rotation. The lock 47 is normally urged downwardly by the spring 49 and may be forced upwardly by the release 50 pivoted upon the standard and disposed so as to be engaged by the trip 51 on the slide 52 carried by the standard 46, and movable therein in a path concentric with the plates as best shown in Fig. 7. The slide 52 has mounted therein a pawl 53 adapted to engage any one of a plurality of notches 54 provided in the edge of the upper plate, the number of notches corresponding to the number of holes 33. The pawl is actuated by a link 55 pivoted thereto at one of its ends and pivoted at the other end to the crank arm 56 on the shaft 57. The shaft 57 is normally held against rotation and is adapted to be actuated for one complete revolution at a time, by means presently to be described. The movement of the pawl and slide is such that the pawl, which is initially in position in a notch, as shown in Fig. 7, will ride along the edge of the top plate and engage in the next notch, the movement being counterclockwise as viewed in Fig. 7, and will then return to the position shown in Fig. 7, carrying with it the top plate, this movement being clockwise, as viewed in Fig. 7. During the counterclockwise movement of the slide the trip 51 will operate the release 50 so as to permit movement of the top plate by the plunger. The clockwise movement of the top plate will serve to move one compartment, which has already received a pin, out from under the end of the chute, and to bring another compartment into position to receive a pin.

When all of the compartments but one have thus been filled and when the last vacant compartment is about to be brought into position under the end of the chute, the arm 43 of the bell crank lever 42 will be just in contact with the stop 41 and the upper arm 44 will be resting against the cam 45, this being the position in which the parts will be left after the preceding operation. Then operation of the top plate will cause the pins 38 to slide in the slots 39, the intermediate plate 35 being held against rotation by the stop 41. The slots 39 are of a length such that travel of the pins 38 from one end to the other thereof will permit the holes in the top and intermediate plates to come into registry and the movement given to the upper plate is such that the holes will so register, if the intermediate plate is held against rotation. Therefore when the distributor has been filled all the compartments thereof are discharged of their contents through the aligned holes in the three plates. To prevent backward movement of the top plate 31, the latch 58 is provided upon the standard 46 and so placed as to engage one of the holes 48 in the top plate, the latch being resiliently held in position by the spring 59.

Figure 11:
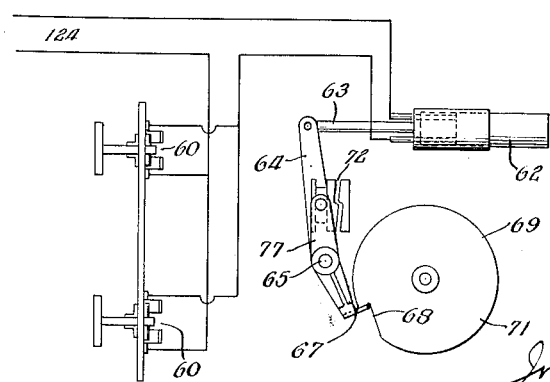
Fig. 11 is a wiring diagram showing the means for controlling the operation of the parts shown in Figs. 7 to 10 inclusive.

The shaft 57 is rotated by means best shown in Figs. 7, 8 and 11 and which means is operated automatically by the pins on the elevator. Referring for a moment to Figs. 3, 5 and 6, it will be seen that there are a plurality of switches 60 disposed at the top of the elevator immediately below the chute, in such a position that one of them must be closed by engagement with the belly of a pin coming into engagement with one of the plates 61 to close the contacts forming the switch 60. When either of the switches 60 is closed the solenoid 62 (Figs. 7, 8 and 11) is energized, thus retracting the armature 63 which is pivoted at its end to an arm 64 secured to a rock shaft 65 journaled in suitable bearings 66. Carried by the rock shaft 65 is the detent 67 adapted to engage in a notch 68 in the disk 69 fast on the shaft 57 and thus to hold said shaft against rotation. The notch is provided with an inclined surface 70 joining the deepest part of the notch with the circular portion 71 of the periphery of the disk so that when the disk is rotated in a clockwise direction, as viewed in Fig. 7, the detent will ride out of the notch and on the circular portion of the periphery and thus permit a complete revolution of the disk. I use this means to control the clutch 72 by which the shaft 57 is rotated. This clutch includes a grooved collar 73 splined upon the shaft 74 which is constantly rotated by a suitable drive from the motor 75 (Fig. 1).

Fast on the rock shaft 65 is a yoke 76 having arms 77 provided with pins riding in the groove of the collar 73. One of the arms 77 is extended beyond the collar and shaft and at its end 78 it is provided with a pin 79 surrounded by a spring 80 engaging the fixed member 81 to urge the arms 77 and consequently the grooved sleeve 73 outwardly to disengage the clutch 72 and force the detent 67 into the notch 68 when they are in registry.

Co-acting with the grooved collar 73 is a sleeve 82 having a clutch face to co-operate with a corresponding clutch face on the collar, the sleeve 82 being loosely mounted upon the shaft 74 and being provided with a worm 83 meshing with a worm gear 84 upon the shaft 57. It will now be obvious that when one of the switches 60 is closed by a pin and the solenoid 62 is thereby energized, the clutch 72 will be engaged and the detent 67 withdrawn from the notch 68. The result will be to rotate the shaft 57. By the time that the pin which has closed the switch has passed the plate 61, the detent 67 will be riding on the circular part of the periphery of the disk 69, and therefore the clutch will remain engaged until the notch has made a complete revolution, during which time the pawl 53 operates the top plate 31, to bring another compartment into position to receive the pin which has caused the actuation of the device. As the notch 68 comes into position opposite the detent 67, the detent will snap into position therein because of the action of the spring 80 and will cause disengagement of the clutch 72 and consequent stopping of the operation. The lock 47 will also be engaged within one of the holes 48 and the latch 58 will prevent backward movement of the plate 31, thus insuring that the apparatus will stop at the desired position of the various parts.

Figure 13:
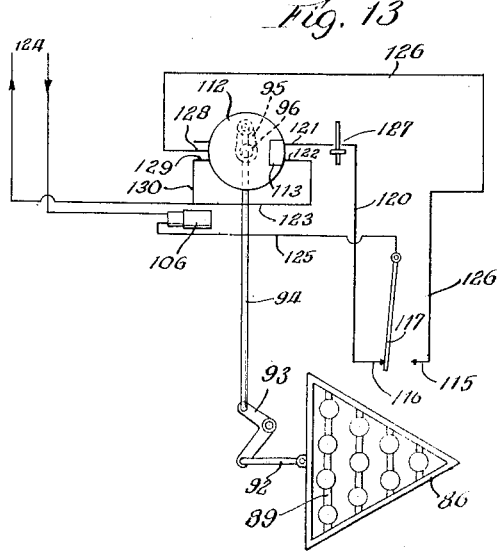
Fig. 13 is a wiring diagram showing the means for controlling the operation of the frame which controls the passage of the pins to the setter.

After the distributor has been filled and has been discharged, as described heretofore, the pins pass down the guides 85, preferably formed of steel rods, and come to rest upon the frame 86 (Figs. 2 and 13). This frame is of the triangular form shown in Fig. 13 and is slidably mounted beneath the deck plate 87, said deck plate being provided with pockets 88 to receive the pins. The frame is provided with transverse bars 89 extending beneath the pockets 88 and it is upon these bars that the pins come to rest, the pockets being of a size to permit free movement of the pins therethrough and having no other bottom than that formed by the bars, and the bars being spaced apart a sufficient distance to permit passage of pins therebetween.

Beneath the frame 86 is disposed the setter, indicated generally by the numeral 90, and comprising a plurality of bottomless containers 91 disposed beneath the pockets 88. Means later to be described are provided for raising and lowering the setter and for depositing the pins therein upon the alley bed. The frame 86 is provided to control the passage of pins to the setter, and to prevent the pins in the pockets 88 from being deposited in the setter until the setter containers are vacant. I therefore provide automatic means controlling the operation of the frame and governed by the presence or the absence of a pin in one of the containers 91, it being of course obvious that similar means may be provided in as many of these containers as may be thought necessary. Such means is exemplified by the device best shown in Figs. 7, 8, 12 and 13, and comprising a link 92 connected by a bell crank lever 93 to a second link 94 pivoted to a crank arm 95 on the shaft 96. The shaft 96 carries a worm gear 97 meshing with a worm 98 upon a sleeve 99 loosely mounted on the shaft 74. A clutch 100 is provided for connecting the sleeve 99 to the shaft 74 and comprises a grooved collar 101 splined upon the shaft 74 and having a clutch face cooperating with a corresponding face on the sleeve 99. The grooved collar is operated by a yoke 102 having pins riding in the groove of the collar 101 and mounted upon a rock shaft 103 to which is secured an arm 104 pivoted to the armature 105 of a solenoid 106. A spring 107 is provided on an extension 108 of the armature 105 to hold said armature normally in the position shown in Fig. 7, whereby the clutch 100 is normally held disengaged. Also mounted on the rock shaft 103 is a detent 109 adapted to cooperate with either one of a pair of notches 110 disposed diametrically opposite each other upon a disk 111 secured to the shaft 96 and thus to hold the shaft against movement and to permit release of the clutch. When the detent is out of either of the notches, it is riding upon the circular portion of the periphery of the disk and therefore will hold the clutch 100 in engagement against the action of the spring 107. Mounted on the upper end of the shaft 96 is a contact member 112 having a contact 113 thereon.

Figure 12:
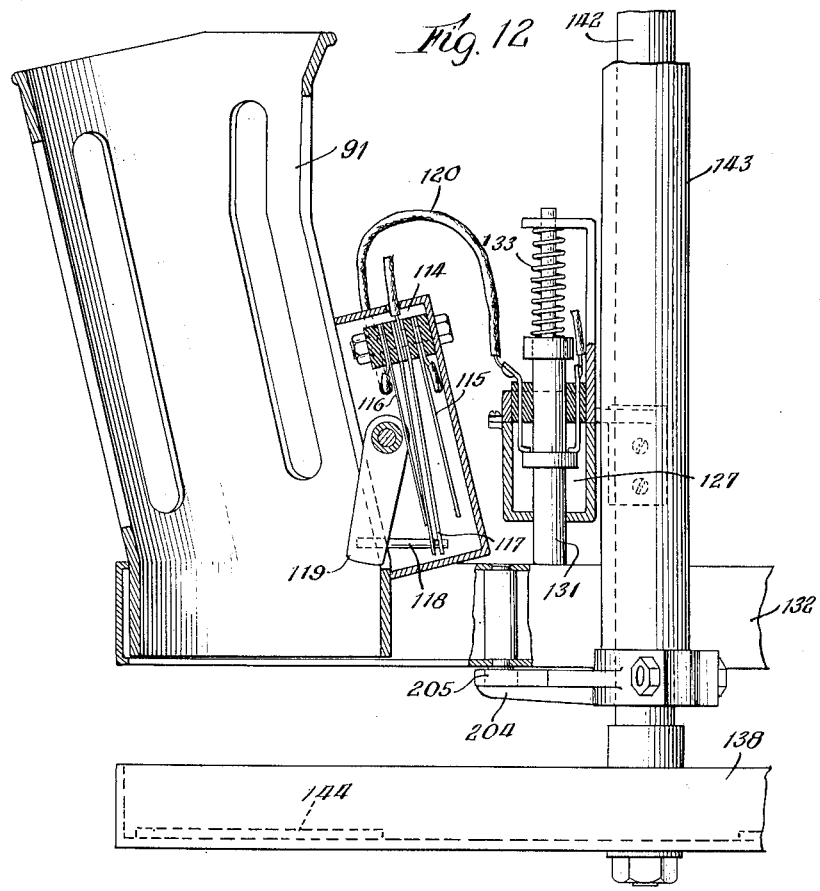
Fig. 12 is a detail view showing the means for rocking the upper deck of the setter, and certain switches shown in Fig. 13.

Referring now particularly to Figs. 12 and 13, in Fig. 12 I have shown a container on the setter having therein two switches adapted to be controlled by the presence or absence respectively of a pin in the container. Mounted in a casing 114 on the side of the container are two spring contacts 115 and 116 and intermediate of these contacts is a third spring contact 117 having its end engaged by a pin 118 carried by an arm 119 pivoted in the casing and projecting into the container when there is no pin present therein. The contact 117 is designed to normally urge the arm 119 to the position shown in Figs. 12 and 13, wherein the contacts 116 and 117 will be in engagement. The contact 116 is connected by a conductor 120 to a terminal 121 contacting with the periphery of the disk 112. A second terminal 122 is disposed adjacent the terminal 121 so that the two may be connected by the contact 113 and the conductor 123 leads from the terminal 122 to one side of the line 124, which leads to any suitable source of current. The contact 117 is connected by a conductor 125 to the solenoid 106 which is connected to the other side of the line 124. The contact 115 is connected through the conductor 126 to a terminal 128 disposed substantially diametrically opposite to the terminal 121 and in position to be engaged by the contact 113 upon revolution of the disk 112. Adjacent to the terminal 128 is a second terminal 129 in such a position that the contact 113 will connect the terminals 128 and 129 when the disk revolves to bring the contact 113 to the proper position. The conductor 130 connects the terminal 129 to the conductor 123.

In operation and when there are no pins in the containers 91 of the setter, the pins will be supported upon the frame 86, and the parts in the container 91, shown in Fig. 12, will be in the positions shown in that figure, while the circuit and parts controlled thereby will be in the positions shown in Fig. 13, it being noted that the circuit is closed through the solenoid 105 energizing the same. Energization of this solenoid will cause engagement of the clutch 100 (Fig. 7) and disengagement of the detent 109 from the notch 110 in which it is resting. The engagement of the clutch will cause rotation of the shaft 96, carrying with it the disks 111 and 112. The circuit through the solenoid will be opened by movement of the contact 113 away from the terminals 121 and 122, but by that time the detent 109 will be riding upon the circular portion of the periphery of the disk 111 and therefore will maintain the clutch closed until the next notch 110 reaches the detent, at which time the spring 107 will cause the clutch to be disengaged. The result will be a half revolution of the shaft 96 with the parts carried thereby and a consequent longitudinal movement of the frame 86 of a sufficient amount to permit the pins thereon to drop between the bars 89 into the containers 91 of the setter.

As a pin enters the container 91 shown in Fig. 12, it will cause the arm 119 to rock about its pivot and bring the contacts 115 and 117 into engagement, thereby closing the circuit through the solenoid, the contacts 115 and 117, conductor 126 and terminals 128 and 129, which will now be joined by the contact 113. This will cause the reengagement of the clutch 100 and a consequent rotation of the shaft 96 and the parts carried thereby through a half revolution, returning the parts to the positions shown in Figs. 7 and 13. The contact 117 will still be in engagement with the contact 115 and therefore the solenoid will remain deenergized as long as the pins remain in the containers 91. The frame 86 is now in position to prevent passage of pins to the setter, and will remain in such position until the containers of the setter are again vacant.

When the setter is lowered to place the pins in position upon the alley bed, it is important that the device just described should not be operated and for that purpose I have provided the switch 127 shown in Figs. 12 and 13 and comprising a plunger 131 adapted to contact with the upper deck 132 of the setter and urged downwardly by the spring 133. By this means when the setter including the deck 132 is lowered the switch 127 is opened, thus making impossible the operation of the frame to release the pins thereon.

The mechanism including the distributor pockets and setter, as well as the mechanism now to be described, is all mounted upon a suitable frame 134 which may conveniently be made of piping, the pipes constituting convenient conduits for the necessary wiring.

Driven from the motor 75 is a shaft 135 extending transversely of the machine and adapted to actuate the setter and the sweep, the latter of which will be described presently. The setter is adapted to be raised and lowered by means of a plurality of flexible elements such as chains or cables 136 trained over sprockets or pulleys, as the case may be. In this form I show these elements as chains trained over sprockets 137 and secured at their lower ends to the lower deck 138 of the setter 90, and secured at their other ends to a counterweight 139. The upper deck 132 is provided with a plurality of magnets 140 disposed so as to co-act with metal blocks in the tops of the pins 141 when said pins are in proper position on the alley bed. Vertical movement of the setter is insured by engagement of the vertical posts 142 of the lower deck 138 in the stationary sleeves 143 secured to the frame. The lower deck 138 is provided with a plurality of transverse bars 144 upon which pins in the containers 91 come to rest when they are deposited in the setter by movement of the frame 86. The magnets 140 are disposed between the bars 144 when the pins are resting upon the bars and in that position they are directly above the correct spots for the pins on the alley bed, the magnets being arranged in the formation of properly spotted pins. By this means it is possible to lower the setter and engage and lift any pins on the alley bed, for example when it is desired to lift standing pins out of the way to sweep the alley clear of "dead wood."

When it is desired to deposit on the alley bed the pins which are in the containers 91, it is obviously necessary to move the upper deck in respect to the lower deck and for this purpose I provide the upper deck with a plurality of rollers 145 running in suitable tracks on the lower deck so that when the upper deck is moved longitudinally of the alley, the pins in the containers 91 may drop through the lower deck between the bars 144 and into position on the alley bed. This motion of course takes place when the setter is lowered to the vicinity of the alley bed, the lowering and the longitudinal movement just referred to being provided by means to be presently described.

The vertical movement of the setter is for two purposes, one of which is to bring the magnets 140 into close juxtaposition to the tops of the pins 141, then to lift the pins from the alley bed while the sweep operates and then to return them to position thereon. The other purpose of the vertical movement of the setter is to permit an entire new set of pins to be deposited on the alley bed and for that purpose it is necessary to have the setter lowered to close juxtaposition to the alley bed. It is thus obvious that two movements of different extents must be provided for the setter and these movements together with the means for achieving them are now to be described.

Referring particularly to Figs. 14 to 18 inclusive, it will be seen that the shaft 135 has splined thereon a grooved collar 146 having a clutch face adapted to co-act with a corresponding face on the sleeve 147 loosely mounted on the shaft 135, these two parts forming the clutch 148. The clutch 148 is normally maintained disengaged by a spring 149 and is adapted to be closed by the energization of a solenoid 150 having its armature connected by the link 151 to the rock shaft 152, to which is secured the yoke 153 having fingers riding in the groove in the collar 146. The sleeve 147 is provided with a worm 154 meshing with a worm gear 155 on a shaft 156 provided at one end with a spur gear 157 (Fig. 16) meshing with the spur gear 158 on the shaft 159. The ratio between the gears 157 and 158 is two to one, whereby the shaft 159 will rotate once for two revolutions of the shaft 156. Secured to the shaft 156 is the crank arm 160 pivotally connected by the link 161 to the rod 162 sliding in the fixed guide 163, whereby the pivot 164 between the link 161 and the rod 162 will always move in a straight line.

Secured to the rock shaft 152 is the arm 165 carrying a detent 166 engaging in a notch 167 in a disk 168 fast on the shaft 159, the notch 167 being provided with an inclined surface connecting the deeper portion thereof with the circular portion of the periphery of the disk. Also secured to the shaft 159 is a cam 169 contacting with a cam roller 170 on a stem 171 slidably mounted on the frame, the roller 170 being urged into engagement with the cam by the spring 172. The stem carries a contact 173 bridging terminals 174 for a purpose which will presently appear. Carried by a disk 175 on the shaft 159 is a contact 176 adapted to close a circuit between the terminals 177 or 177'.

Also splined on the shaft 135 is a second grooved collar 178 (Fig. 14) having a clutch face adapted to cooperate with a corresponding clutch face on a sleeve 179 loosely mounted on the shaft 135, this sleeve being provided with a worm 180 meshing with a worm gear 181 on a shaft 182. The members 178 and 179 form the clutch 183 and this clutch is controlled by the yoke 184 having pins riding in the groove in the collar and mounted on a rock shaft 185. The rock shaft and consequently the clutch is operated by an arm 186 pivoted to the armature 187 of the solenoid 188. Secured to the rock shaft 185 is an arm 189 provided with a detent 190 adapted to engage in a notch 191 in a disk 192 on the shaft 182, this notch 191 also being provided with an inclined surface whereby the detent 190 may ride out of the notch on to the circular part of the periphery of the disk. Also secured to the shaft 182 is a disk 193 having a contact 194 adapted to bridge the terminals 195 for a purpose which will presently appear.

Mounted adjacent one end of the shaft 182 is a cam 196 engaging a cam roller 197 on a bell crank lever 198 having three arms, one of which carries the cam roller 197, another of which is pivotally connected to the link 199 and the other of which is pivotally connected to the link 200. The link 199 is pivotally connected to the arm 201 fast on one of the vertical posts 142, which it will be remembered are vertically slidable and are also rotatable in the stationary sleeve 143. As shown in Fig. 1, the link 200 is connected through the bell crank lever 202 and link 203 to another arm 201 fast on the vertical post 142 on the other side of the machine. Referring for a moment to Figs. 2 and 12, it will be seen that the posts 142 are provided with rock arms 204 fast to the posts and slidably pivoted at 205 to the upper deck 132 of the setter. Therefore actuation of the bell crank lever 198 by the cam 196 will cause actuation of the rocking arms 204 to cause longitudinal movement of the upper deck relative to the lower deck of the setter to discharge the pins in the containers 91. Suitable springs 206 are provided to insure proper contact between the cam roller 197 and the cam 196.

Raising and lowering of the setter is effected by rotation of the sprockets 137, one of which, as shown in Fig. 2, is provided with a pinion 207 meshing with a rack 208 pivotally connected by the link 209 to the link 210 which in turn is pivoted at one end to the pivot 164 and is pivoted at 212 intermediate its ends to the link 211 which is eccentrically pivoted to the cam 196, as plainly shown in Fig. 14.

It will be obvious that rotation of the shaft 156 will cause the link 210 to be rotated about the pivot 212 to operate the rack and it will also be obvious that this rotation will result in a movement of the rack substantially equal to the movement of the pivot 164. The various parts are shown in normal position in Figs. 2, 14 and 19. Rotation of the shaft 156 will bring the parts to the position shown in Fig. 20. This movement is sufficient to cause the rack to actuate the sprockets to lower the setter until the magnets 140 are in close juxtaposition to the tops of the pins 141. Continued rotation of the shaft 156 will cause the parts to come back to the position shown in Fig. 21 wherein they occupy the same positions as in Figs. 14 and 19 and in which the setter is returned to the position shown in Fig. 2, carrying with it whatever pins may have been in position on the alley bed. This operation is of use in case of a spare, that is, in case some pins have been knocked over, but others remain standing. The pins knocked over, which are commonly known as dead wood, may then be swept out of the alley and continued rotation of the shaft 156 will cause the setter to be lowered so as to replace the pins on the alley bed and then to return to the position shown in Fig. 2. Suitable means is provided for energizing and deenergizing the magnets at the proper times and for operating the sweep at the proper time. The controls for these movements will be described more in detail later.

When it is desired to deposit an entire new set of pins upon the alley bed, as when all pins have been knocked down and swept out of the way, it is necessary to impart a greater movement to the setter and consequently to the rack 208. This movement is achieved by rotation of the cam 196 which will operate the link 210 by application of force at the pivot 212 instead of at the pivot 164, the latter remaining stationary. This will give a substantially greater movement to the rack as will be evident particularly from an inspection of Fig. 22, wherein is shown the maximum extent of movement of the pivot 212. It will be noted that the cam 196 acts as a crank to give this movement to the link 211 and consequently to the pivot 212, as well as acting as a cam to operate the bell crank lever 198.

When the movement illustrated in Fig. 22 is given to operate the setter and bring it into position close to the alley bed, it is also necessary to operate the upper deck of the setter so as to permit the pins to fall between the bars 144 and come to rest upon the proper spots for them, this result being insured by the fact that the containers are in the formation of correctly spotted pins, and the pins therein will be moved to the position vacated by the magnets. The rocking movement of the upper deck is achieved by action of the cam 196 which actuates the bell crank lever 198 and the link 199 as best illustrated in Fig. 22. During a complete revolution of the cam the upper deck is rocked forwardly and then backwardly, after an interval sufficient to permit the setter to be lifted clear of the pins.

The sweep shown in Figs. 1 and 2 comprises a transverse member 213 revolvably mounted in suitable brackets 214 on the frame and provided with forwardly extending arms 215 pivoted to the ends of which are depending arms 216 supporting the transverse sweep bar 217 which is adapted to contact with the pins 141 and sweep them into the pit when the sweep is operated, suitable rollers 218 being provided to keep the member 217 from contacting with the alley bed. Pivoted in suitable brackets 219 on each side of the frame are arms 220 provided with latches 221 on spring pressed latch bars 222 engaging detents on the frame as shown in Fig. 2, to hold the arms in horizontal position. The end of each arm is provided with a transverse pin received within an arcuate slot in a sector 223 pivoted to the end of each arm 220 and carrying a second arm 224 pivoted to the member 217, thus forming a jointed lower arm. By this means as the sweep is depressed, the arm 224 will pivot about the end of the arm 220 until the end of the slot in the sector 223 engages the pin on the end of the latch rod and withdraws the latch 221 from the detent on the frame thereby permitting the arm 220 to rock about its pivot. Therefore, a double pivoting action is obtained, making possible a more compact arrangement of sweep and also the mounting of the sweep lower than would otherwise be practical.

The sweep is actuated by a curved lever 225 secured at one end to the transverse member 213 and pivoted at the other end to the actuating rod 226 (Figs. 2, 14 and 15). The lower end of the actuating rod is secured by a universal joint 227 to a crank arm 228 upon the shaft 229, which is provided with a worm gear 230 meshing with a worm 231 upon the sleeve 232 loosely mounted on the shaft 135. The end of the sleeve 232 is provided with a clutch face adapted to cooperate with a corresponding face on a grooved collar 233 splined upon the shaft 135 and normally urged out of engagement with the sleeve 232 by the spring 234, the members 232 and 233 forming the clutch 235. The clutch is operated by a yoke 236 having pins traveling in the groove of the collar and mounted on a rock shaft 237 to which is secured an arm 238 pivoted to the armature 239 of the solenoid 240. The spring 234 operates upon the arm 238 as will be evident from an inspection of Figs. 14 and 15. Carried by one end of the rock shaft 237 is the arm 241 provided with a detent engaging in a notched disk 242 having a form and function similar in all respects to the notched disk 192, shown in Fig. 16. That is, the detent permits engagement of the clutch against the action of the spring 234 and then by engagement with the circular part of the periphery of the rotating disk holds the clutch in engagement against the action of the spring 234 after the solenoid has become deenergized. The disk 242 is carried by the shaft 229 which also carries the disk 243 having a contact 244 adapted to bridge the terminals 245 or 245'.

The controls for the various operations are shown in the wiring diagrams of Figs. 17 and 18, only such parts of the diagrams being shown in each figure as are necesary to illustrate the operations. Referring first to Fig. 17, which shows the controls for the operation which involves placing a new set of pins on the alley bed, I have shown a conductor 246 connected to one side of the line 124 and extending to one of the terminals 245, the other of which is connected by a conductor 247 to one of the terminals 195, the other of which is connected by a conductor 248 to a hand controlled switch 249 which is connected by a conductor 250 to a solenoid 240 connected to the other side of the line 124 by the conductor 251. One of the terminals 245' is connected to one side of the line by the conductor 252 and the other is connected by the conductor 253 to one of the terminals 177 which are bridged by the contact 176 and the other of which terminals is connected by the conductor 254 to the solenoid 188 connected to the other side of the line by the conductor 255.

In operation the closing of the switch 249, which is conveniently located at the bowling end of the alley, will cause current to pass from the line through the conductor 246, terminals 245, conductor 247, terminals 195, conductor 248, switch 249, conductor 250, solenoid 240 and back to the line thus energizing the solenoid 240 and setting in operation the sweep mechanism controlled thereby. The circuit is twice broken by movement of the contact 244 away from the terminals 245 and 245', but continued operation of the device will be assured by the co-action of the detent on the arm 241 with the periphery of the disk 242, as explained above. As the contact 244 turns through substantially 180° it bridges the terminals 245' thus closing the circuit from one side of the line through the conductor 252, terminals 245', conductor 253, terminals 177, conductor 254, solenoid 188, and conductor 255 back to the other side of the line, thus energizing the solenoid 188 and setting in operation the mechanism for closing the clutch 183 whereby the rack 208 will be operated to bring the setter into close juxtaposition to the alley bed and whereby the bell crank lever 198 will also be operated at the proper moment by the cam 196 to move the upper deck of the setter longitudinally, as described above, to deposit the pins upon the bed and, after the setter has been lifted a substantial distance from the bed, to then return the upper deck to its normal position. By continued rotation of the disks 243 and 193 the circuit is again broken at the terminals 245' and the contact 194 will also move out of engagement with the terminals 195, but the clutches 235 and 183 will nevertheless be held in operative position by the means described above. The first described circuit through the switch 249 is now broken at the terminals 195 so that it is impossible to interfere with the operation of the device until the contact 194 has completed a revolution and again bridges the terminals 195 at which time all parts will have returned to their normal positions. It will be noted that the conductor 246 is connected to its side of the line through the contact 113 on the disk 112, which contact controls the operation of the frame 86. Therefore, it will be obvious that operation of the controls shown in Fig. 17 will be impossible when the circuit is opened at the contact 113, or in other words when the frame 86 is being operated. Similarly, when the above described operation is taking place, it will be impossible to operate the frame 86, as the circuit controlling the same will be open substantially all of the time.

Referring now to Fig. 18, wherein is shown the wiring which controls the means for lifting and replacing pins on the bed and operating the sweep when a spare has been made, one side of the line 124 is connected through the contact 113 by the conductor 130

246 to one of the terminals 245, the other of which is connected by the conductor 247 to one of the terminals 195, the other terminal 195 being connected by the conductor 248 to the switch 256, located conveniently adjacent the switch 249 for manual operation. The conductor 257 connects the switch 256 to one of the terminals 177, the other of which is connected by conductor 258 to solenoid 150 connected by the conductor 259 to the other side of the line. Closing of the switch 256 will then result in energizing the solenoid 150 which will cause engagement of the clutch 148 and consequent rotation of the shaft 156 which, as described above, will cause a movement of the rack 208 sufficient to bring the setter to a position closely adjacent the tops of the pins 141, where it will lift the pins, then replace them on the alley bed and then return to its normal position which is that shown in Fig. 2. For this purpose it is obvious that two revolutions of the shaft 156 are required and during these two revolutions the shaft 159 (Fig. 16) is given one revolution.

The rotation of the shaft 159 is in a clockwise direction as viewed in Fig. 16 and the rotation of this shaft is employed to control the sequence of operations of other parts of the machine which co-operate with the setter. Movement of the contact 176 soon breaks the circuit to the solenoid 150, but the clutch is nevertheless maintained in engagement by the detent 166 riding upon the circular portion of the periphery of the disk 168, until the shaft 159 has completed one revolution or until the shaft 156 has completed two revolutions. When the shaft 156 has completed half a revolution, bringing the various parts to the position shown in Fig. 20, the shaft 159 will have completed a quarter revolution and the contact 176 will bridge the terminals 177'. Current will then pass from one side of the line through the conductor 246, terminals 245, conductor 247, terminals 195, a portion of conductor 248, terminals 177', conductor 250, solenoid 240 and conductor 251 back to the other side of the line. The solenoid 240 will then be energized, thus actuating the sweep, which operation has been fully described above and need not be repeated here. As the terminals 177' are bridged the cam 169 has forced the contact 173 across the terminals 174, these terminals being in the circuit which controls the magnets 140 in a manner well known in the art. Therefore as the sweep starts to operate, the magnets are energized and continued rotation of the shaft 156 causes actuation of the rack 208 to lift the standing pins, the parts returning to the position shown in Fig. 21. By this time the shaft 156 has completed a revolution and the shaft 159 and cam 169 have completed a half revolution. It will be noted that substantially half of the surface of the cam 169 is circular as shown in Figs. 16 and 18 so that the magnets will be energized during a complete rotation of the shaft 156 and a half rotation of the shaft 159, this movement being that necessary to lift the pins from the floor and to replace them. Continued rotation of the shafts 156 and 159 will therefore maintain the magnets energized until the cam 169 has rotated through substantially 270° from the position shown in Figs. 16 and 18. By that time the pins will have been replaced upon the bed and therefore the magnet circuit may be opened at the terminals 174. The clutch 148 will remain in engagement until completion of two full revolutions of the shaft 156 and one full revolution of the shaft 159, after which the detent 166 will snap into the notch 167 and the parts will be back in the position shown in Figs. 14, 16, 18 and 19.

Referring to Fig. 23 I have shown therein a device substantially similar to that just described, but in which the sweep is disposed in a more advantageous position, within the confines of the other mechanism. In this form the sweep comprises arms 260 fast to the shaft 261, disposed a substantial distance from the front of the frame, and on which the rear sprockets 137 are loosely mounted in this modification. Power for operating the setter is applied to the shaft 262, on which the front sprockets 137 are secured, by the rack 263 operating the pinion 264 on the shaft 262. The rack is operated from the shaft 135 in the same manner as the rack 208 in the modification described above. The upper deck 132 of the setter is rocked by rods 199 corresponding to those shown in Figs. 1 and 2. The shaft 261 is rotated to operate the sweep by means of an actuating rod 265 connected to a crank arm 266 mounted on a shaft 267 driven from shaft 135 by suitable gearing, such as that shown between the shafts 135 and 229, and controlled in the same manner as is shaft 229. The end of the actuating rod 265 is pivoted to an arm 268 fast on the shaft 261, whereby actuation of the crank 266 will cause the shaft 261 to rock and operate the sweep. The sweep further comprises an arm 269 pivoted to the forward end of the arm 260 and carrying the sweep bar 270 with rollers 271. Pivoted to the arm 269 is a rod 272 slidably mounted in a bracket 273 which also serves to secure the arm 260 to the shaft 261. A spring 274 co-acts with the bracket 273 and the rod 272 to maintain the sweep member 270 in the raised position shown in full lines. As the sweep is operated to the position shown in dotted lines, the arm 269 pivots in respect to the arm 260 as the rollers 271 come in contact with the alley bed and then as the sweep is restored to the position shown in full lines, the spring 274 will absorb the shock of the return movement of the arm 269 and will halt its movement at the proper point. By this arrangement I provide a sweep whose movement is substantially entirely within the limits of the frame.

I am aware that changes in the form, construction and arrangement of parts may be made without departing from the spirit and without sacrificing the advantages of the invention and I reserve the right to make all such changes as fairly fall within the scope of the following claims.

I claim:

1. A bowling alley pin setter, comprising an elevator, a plurality of buckets on the elevator, and means for maintaining said buckets in a vertical position on the downward travel of the elevator and in a horizontal position on the upward travel of the elevator.

2. A bowling alley pin setter comprising an elevator extending transversely at the back of the pit of the bowling alley and comprising a plurality of buckets adapted to carry the bowling balls or pins, and means for maintaining said buckets in a vertical position on the downward travel of the elevator and in a horizontal position on the upward travel of the elevator.

3. The combination with the pit of a bowling alley, of an elevator comprising a flexible element having a portion thereof extending angularly into the pit, a plurality of buckets on said element adapted to carry bowling balls or pins, and means for maintaining said buckets in a vertical position on the downward travel of the elevator and in a horizontal position on the upward travel of the elevator.

4. The combination with the pit of a bowling alley, of an elevator comprising a flexible element located at the back of the pit and having a portion extending forwardly into the pit, a plurality of buckets on said element adapted to carry bowling balls or pins, and means for maintaining said buckets in a vertical position on the downward travel of the elevator and in a horizontal position on the upward travel of the elevator and during its travel throughout said angular portion.

5. In a pin setter, an elevator comprising a plurality of buckets, each bucket adapted to carry a pin, and means operating when more than one pin is carried by a bucket to discharge the extra pin.

6. In a pin setter, an elevator comprising a plurality of buckets, each bucket adapted to carry a pin, and means operating when more than one pin is carried by a bucket to discharge the extra pin, said means comprising a pivoted member adapted to project into the path of travel of said buckets.

7. In a pin setter, an elevator comprising a plurality of buckets, each bucket adapted to carry a pin, and means to prevent a bucket from carrying more than one pin above a certain height and comprising a pivoted member arranged to be operated by one pin to discharge another pin from the same bucket.

8. In a pin setter, an elevator comprising a stationary back and having a plurality of buckets, each bucket adapted to carry a pin, and means on said back operating when more than one pin is carried by a bucket to discharge the extra pin.

9. In a pin setter, an elevator comprising a stationary back and having a plurality of buckets, each bucket intended to carry a single pin, and means on said back operating when two pins are carried by a bucket one upon and above the other to discharge the extra pin.

10. The combination with the pit of a bowling alley, of an elevator comprising a flexible element, a portion of said element passing beneath said pit, a plurality of buckets on said element and each adapted to contain either a ball or a pin, means to displace a ball from said elevator at a certain height, and means to discharge a pin from said elevator at a certain height.

11. The combination with the pit of a bowling alley, of an elevator disposed adjacent the end of said pit and comprising flexible elements having a plurality of buckets attached thereto and having a portion thereof extending beneath said pit, and means for maintaining said buckets in a horizontal position when passing beneath said pit and when travelling upwardly.

12. In a pin setter, an elevator comprising a pair of flexible elements, lugs pivoted to said elements, buckets rigidly secured to said lugs, said elevator having sides provided with channels to receive said lugs in the upward travel of said buckets and to maintain said buckets in a horizontal position.

13. In a pin setter, an elevator comprising a pair of flexible elements, lugs pivoted to said elements, buckets rigidly secured to said lugs, said elevator having sides provided with channels to receive said lugs in the upward travel of said buckets and to maintain said buckets in a horizontal position, and means at the top of said channels to cause said buckets to tip.

14. In a pin setter, an elevator comprising a plurality of buckets, each bucket adapted to carry either a pin or a ball, and stationary means for guiding a ball towards the center of said bucket.

15. In a pin setter, an elevator comprising a back, a plurality of buckets mounted to move upwardly in front of said back, each bucket adapted to carry either a ball or a pin and said back being formed to direct a ball toward the center of said bucket.

16. In a pin setter, an elevator comprising sides, a plurality of buckets mounted to move upwardly between said sides, and guides resiliently hinged to said sides adjacent the bottom thereof, for the purpose set forth.

17. In a pin setter, an elevator comprising a back, a plurality of buckets mounted to move upwardly and in front of said back and each bucket adapted to carry a pin, a member pivoted on said back and having its upper end projecting into the path of travel of said buckets, said member having a recess therein adapted to receive a pin on a bucket, the portion of the member below said recess being in position to contact with the bucket when the pin carried thereby is in said recess and the portion of the member above said recess extending above said pin so as to displace a second pin which may have been picked up by the bucket.

18. In a pin setter, an elevator having a plurality of buckets each adapted to carry either a ball or a pin, a stationary back to direct a ball towards the center of said buckets, and means on the back to discharge a ball from a bucket at a predetermined point.

19. In a pin setter, an elevator comprising a back, a plurality of buckets mounted to travel upwardly in front of said back, each bucket adapted to contain either a pin or a ball, said back provided with a recess in the center thereof so that a ball carried by said bucket will be guided towards the center thereof, and a projection in said recess to displace a ball from a bucket as the bucket passes said projection.

20. In a pin setter, an elevator comprising a back, a plurality of buckets mounted to travel upwardly in front of said back, said back provided with a recess in the center thereof so that a ball carried by said bucket will be guided towards the center thereof, and a projection in said recess to displace a ball from a bucket as the bucket passes said projection.

21. In a pin setter, an elevator comprising a plurality of buckets adapted to carry pins, a pivoted member having a lower portion normally in the line of travel of a pin in a bucket and a bar on its upper end adapted to be forced forwardly by engagement of a pin in a bucket with said lower portion, said forward movement displacing an additional pin if such is being carried by the bucket.

22. In a pin setter, an elevator comprising a plurality of buckets adapted to carry pins, a pivoted member having a lower portion normally in the line of travel of a pin in a bucket and a bar on its upper end adapted to be forced forwardly by engagement of a pin in a bucket with said lower portion, said forward movement displacing an additional pin if such is being carried by the bucket, said lower portion and said bar being spaced apart a sufficient distance to permit one pin carried by said bucket to force said bar backwardly, to clear said pin and bucket.

23. The combination with the pit of a bowling alley, of an elevator having a plurality of buckets thereon adapted to carry pins out of said pit, a rotary distributor having a plurality of compartments adapted to receive pins, means to discharge a pin from bucket, means to rotate said distributor to bring said compartments successively into position to receive a pin, and means to control rotation of said distributor by a pin in one of said buckets.

24. In a pin setter, an elevator having a plurality of buckets adapted to carry pins, a chute adjacent the top of said elevator, a rotary distributor having a plurality of compartments each adapted to contain a pin, and means operated by a pin in the elevator for rotating said distributor intermittently to bring successive compartments beneath the end of said chute.

25. In a pin setter, an elevator having a plurality of buckets adapted to carry pins, a chute adjacent the top of said elevator, a rotary distributor having a plurality of compartments each adapted to contain a pin, means for rotating said distributor intermittently to bring successive compartments beneath the end of said chute, and means to control the operation of said distributor, said means being governed by the presence of a pin in one of said buckets.

26. In a pin setter, an elevator comprising a plurality of buckets, each bucket adapted to carry a pin lengthwise therein, a chute adjacent the top of said elevator, a distributor rotatably mounted beneath said chute and having a plurality of compartments each adapted to receive a pin, means for rotating said distributor to bring said compartments successively into position beneath said chute, said means controlled by an electric circuit, and contacts in said circuit adjacent said elevator and adapted to be closed by a pin carried by one of said buckets.

27. In a pin setter, an elevator comprising a plurality of buckets, each bucket adapted to carry a pin lengthwise therein, a chute adjacent the top of said elevator, a distributor rotatably mounted beneath said chute and having a plurality of compartments each adapted to receive a pin, means for rotating said distributor to bring said compartments successively into position beneath said chute, said means controlled by an electric circuit, and a plurality of pairs of contacts in said circuit adjacent said elevator and so arranged that one of said pairs will be closed by a pin occupying any position in one of said buckets.

28. In a pin setter, an elevator adapted to carry pins, means to discharge pins from said elevator, a distributor having a plurality of compartments each adapted to receive a pin, 'means operated by a pin in said elevator for rotating said distributor to bring said compartments successively into position to receive a pin, and means for discharging all of said containers when the last one has received a pin.

29. In a pin setter, a distributor comprising a plurality of superposed plates each plate provided with holes through which pins may pass, said holes being normally out of alignment to prevent passage of pins therethrough, means operated by the pin before it enters the distributor for rotating said distributor to bring the holes in one of said plates successively into position to receive the pin, and means for causing relative movement between said plates to bring said holes into alignment at a predetermined point.

30. In a pin setter, a distributor comprising two plates revolvably mounted on the same pivot and each containing the same number of holes, the holes being of a size to permit passage of pins therethrough but being normally out of alignment to prevent such passage, means operated by the pins before they enter the distributor for rotating said plates in unison to bring the holes in one of them into position successively to receive the pins, and means to cause relative movement between said plates to bring said holes into alignment to discharge said pins.

31. In a pin setter, a distributor comprising a plurality of compartments each adapted to receive a pin, means operated by the pins before they enter the distributor for intermittently moving said distributor to bring said compartments successively into position to receive the pins, and means for locking said distributor between said intermittent movements.

32. In a pin setter, a distributor comprising a plurality of compartments each adapted to receive a pin, means operated by the pins before they enter the distributor for intermittently moving said distributor to bring said compartments successively into position to receive the pins, means for locking said distributor between said intermittent movements, and means for preventing backward movement of said distributor.

33. In a pin setter, a distributor comprising a rotatable plate having a plurality of compartments thereon, each of said compartments adapted to hold a pin, means operated by the pin before it enters the distributor to intermittently rotate said plate, and means to lock said plate between said intermittent movements.

34. In a pin setter, a distributor comprising a plate, a plurality of compartments thereon and each adapted to receive a pin, said plate having its periphery provided with a plurality of notches, a pawl adapted to engage said notches in succession, and means for operating said pawl to rotate said plate.

35. In a pin setter, a distributor comprising a rotatable plate, a plurality of compartments thereon and each adapted to receive a pin, said plate having a plurality of notches in its periphery, a pawl adapted to engage in said notches, means for operating said pawl to rotate said plate, means to lock said plate against movement, and means movable with said pawl to release said locking means.

36. In a pin setter, a distributor comprising three superposed plates, the bottom plate being fixed, the top and intermediate plates being rotatable about the same axis, the three plates being provided with the same number of holes, each hole being of a size to permit passage of a pin, the holes in the bottom and intermediate plates being normally in alignment and the holes in the top plate being out of alignment with the holes in the intermediate and bottom plates, means operated by the pins before they enter the distributor for rotating said top and bottom plates in unison, means to deposit pins successively in the holes in said top plate, and means to cause relative movement between said top and bottom plates to bring the holes therein into alignment.

37. In a pin setter, a distributor comprising two superposed plates each provided with the same number of holes, each hole being of a size to permit passage of a pin, the holes in said plates being normally out of alignment, means operated by the pin before it enters the distributor for rotating the top plate intermittently into position for a hole therein to receive the pin, means causing rotation of the other plate with said top plate, and means permitting relative movement between said plates at a predetermined point to bring said holes into alignment and to discharge said pins.

38. In a pin setter, a distributor comprising two superposed plates each of said plates being provided with the same number of holes, each hole being of a size to permit passage of a pin, said holes being normally out of alignment with each other, means operated by a pin before it enters the distributor for intermittently rotating the top plate to bring said holes therein successively into position to receive a pin, means causing the other plate to rotate with said top plate, and means preventing rotation of said other plate when all of said holes except one have received pins, whereby as the last pin is received within the hole in the top plate all of said pins will be discharged through the holes in said plates.

39. The combination of a bowling alley pit, an elevator adapted to carry pins upwardly from said pit, means to discharge pins from said elevator, a rotary distributor having a plurality of compartments each adapted to contain a pin, means operated by the pins while in the elevator for rotating said distributor to bring said compartments successively into position to receive said pins from said elevator, a setter above the spotting position of the pins on said alley bed, and means to discharge the pins from said distributor to said setter.

40. In a pin setting mechanism, a setter having a plurality of containers for pins, and a frame disposed above said setter and controlling the passage of pins into said containers, the operation of said frame being controlled by the presence or absence of pins in said setter.

41. In a pin setting mechanism, a setter having a plurality of containers to receive pins, a frame mounted above said setter and controlling the passage of pins into said containers, and means to reciprocate said frame and operated by the presence or absence of pins in said setter.

42. In a pin setting mechanism, a setter having a plurality of containers to receive pins, a frame disposed above said setter and controlling the passage of pins to said containers, means controlled by the absence of pins in the setter to reciprocate said frame in one direction to permit pins to enter said containers.

43. In a pin setting mechanism, a setter having a plurality of containers to receive pins, a frame disposed above said setter and controlling the passage of pins to said containers, means to reciprocate said frame in one direction when said containers are empty to permit pins to enter said containers, and means to reciprocate said frame in the opposite direction when said pins have entered said containers to cause said frame to again prevent passage of pins to said containers.

44. In a pin setting mechanism, a setter having upper and lower decks, said lower deck having openings therein for the passage of pins therethrough, said upper deck having containers to receive pins, said pins normally resting upon said lower deck, a plurality of magnets on said upper deck and disposed directly above the openings in said lower deck, and means for moving one of said decks in relation to the other to permit passage of said pins through said openings.

45. In a pin setting mechanism, an alley bed, a setter, means for moving said setter vertically in respect to said alley bed, said setter comprising upper and lower decks, said lower deck having openings therein for the passage of pins therethrough, said upper deck having a plurality of magnets normally over said openings and arranged in the formation of properly spotted pins, and means to move one of said decks horizontally in respect of the other to permit passage of said pins through said openings.

46. In a pin setting mechanism, an alley bed, a setter, means for moving said setter vertically in respect to said alley bed, said setter comprising upper and lower decks, said lower deck having openings therein for the passage of pins therethrough, said upper deck having a plurality of magnets normally over said openings and arranged in the formation of properly spotted pins, and means to move said upper deck in respect to said lower deck to displace said magnets and to bring said pins into said formation.

47. In a pin setting mechanism, an alley bed, a setter, said setter comprising upper and lower decks, said lower deck having openings therein for the passage of pins therethrough, said upper deck having a plurality of bottomless containers for pins, the pins in said containers being supported on said lower deck, magnets on said upper deck and arranged in the formation of properly spotted pins, said magnets normally over said openings and said containers corresponding in number to said magnets and disposed at one side thereof, and means for moving said upper deck to bring said containers over said openings in place of said magnets.

48. In a pin setting mechanism, an alley bed, a setter, said setter comprising upper and lower decks, said lower deck having openings therein for the passage of pins therethrough, said upper deck having a plurality of bottomless containers for pins, the pins in said containers being supported on said lower deck, magnets on said upper deck and arranged in the formation of properly spotted pins, said magnets normally over said openings and said containers corresponding in number to said magnets and disposed at one side thereof, means for moving said upper deck to bring said containers over said openings in place of said magnets, means for lowering said setter to a position in close juxtaposition to the tops of pins on said bed, and means for lowering said setter to position in close juxtaposition to said bed.

49. In a pin setting mechanism, an alley bed, a setter, said setter comprising upper and lower decks, said lower deck having openings therein for the passage of pins therethrough, said upper deck having a plurality of bottomless containers for pins, the pins in said containers being supported on said lower deck, magnets on said upper deck and arranged in the formation of properly spotted pins, said magnets normally over said openings and said containers corresponding in number to said magnets and disposed at one side thereof, means for moving said upper deck to bring said containers over said openings in place of said magnets, means for lowering said setter to a position in close juxtaposition to the tops of pins on said bed, means for lowering said setter to position in close juxtaposition to said bed, and means for energizing said magnets when said setter is lowered to said first named position.

50. In a pin setting mechanism, a setter normally disposed above an alley bed, means to lower said setter to a position close to said bed, means to lower said setter to a position close to the tops of pins on said bed, a single element controlling both of said movements, and means for operating said element to cause either one of said movements.

51. In a pin setting mechanism, a setter, means for lowering said setter into engagement with an alley bed, means for releasing pins from said setter when in said lowered position, a shaft, a member on said shaft operating both of said means, and means for rotating said shaft.

52. In a pin setting mechanism, a setter, means for operating said setter and comprising a link, one end of said link being operatively connected to said setter and being pivotally supported at its other end and between its ends, and means for moving one of said pivots to cause rotation of said link about the other of said pivots.

53. In a pin setting mechanism, a setter, means for operating said setter and comprising a link, one end of said link being operatively connected to said setter and being pivotally supported at its other end and between its ends, means for moving one of said pivots to cause rotation of said link about the other of said pivots, and means for maintaining the movement of one of said pivots in a straight line.

54. In a pin setting mechanism, a setter, means for operating said setter and comprising a link operatively connected to said setter and having two pivots, and means for actuating said link by movement of one of said pivots about the other.

55. In a pin setting mechanism, a setter, means for operating said setter and comprising a link operatively connected to said setter and having two pivots, means for actuating said link by movement of one of said pivots about the other, and means for maintaining the movement of one of said pivots in a straight line.

56. In a pin setting mechanism, a setter, means for lowering said setter into engagement with an alley bed, means for releasing pins from said setter when in said lowered position, a shaft, and a cam on said shaft and operating one of said means, said cam acting also as a crank to operate the other of said means.

57. In a pin setting mechanism, a setter, means to raise and lower said setter, two shafts each provided with cranks, a link having two pivots connected to said cranks and operatively connected with said raising and lowering means, and means for operating either one of said shafts to cause movement of one of said pivots about the other.

58. In a pin setting mechanism, a setter, means to raise and lower said setter, two shafts each provided with cranks, a link having two pivots connected to said cranks and operatively connected with said raising and lowering means, means for operating either one of said shafts to cause movement of one of said pivots about the other, and means to release the pins from said setter and operated from one of said shafts.

59. In a pin setting mechanism, a setter, means for raising and lowering said setter, two shafts, cranks on each of said shafts, one of said cranks being formed as a cam, means for releasing pins from said setter and operated by said cam, a link having pivots connected to each of said cranks, and means for rotating either of said shafts to cause rotation of said link about one of said pivots, rotation of one of said shafts operating said pin releasing means.

60. In a pin setting mechanism, a setter, means for raising and lowering said setter and comprising a shaft having a pinion, a rack meshing with said pinion, and means for giving said rack a plurality of movements of different extent.

61. In a pin setting mechanism, a setter, a shaft having a wheel thereon, a flexible element supporting said setter and trained over said wheel, a pinion on said shaft, a rack meshing with said pinion, and means for operating said rack.

62. In a pin setting mechanism, a setter, a shaft having a wheel thereon, a flexible element supporting said setter and trained over said wheel, a pinion on said shaft, a rack meshing with said pinion, and means for giving said rack a plurality of movements of different extent.

63. In a pin setting mechanism, a setter, means for raising and lowering said setter and comprising a shaft having a pinion thereon, a rack meshing with said pinion, a link operatively connected with said rack and having two pivots, and means for moving either of said pivots about the other to give said rack a plurality of movements of different extent.

64. In a pin setting mechanism, a frame, a shaft on said frame and disposed a substantial distance from the front thereof, a sweep comprising an arm mounted on said shaft and extending toward the front of said frame, a second arm pivoted to the front end of said first arm and carrying a sweep bar, a bracket on said shaft, and a rod pivotally secured to said second arm and slidably mounted in said bracket.

65. In a pin setting mechanism, a frame, a shaft on said frame and disposed a substantial distance from the front thereof, a sweep comprising an arm mounted on said shaft and extending toward the front of said frame, a second arm pivoted to the front end of said first arm and carrying a sweep bar, a bracket on said shaft, a rod pivotally secured to said second arm and slidably mounted in said bracket, and resilient means controlling the movement of said rod in respect to said bracket.

66. In a pin setting mechanism, a sweep, a setter, means for operating said sweep, means for operating said setter, said sweep operating means automatically setting in movement said setter operating means.

67. In a pin setting mechanism, a sweep, a setter, means for operating said sweep and said setter including an electric circuit, closing of said circuit causing operation of both said sweep and said setter, and means preventing a second closing of said circuit until completion of the operation of said sweep and setter.

68. In a pin setting mechanism, a setter, means controlling the passage of pins to said setter, means for raising and lowering said setter and including an electric circuit, said circuit being opened when said pin controlling means is being operated.

69. In a pin setting mechanism, a setter, means for controlling the passage of pins to said setter and including an electric circuit, means for raising and lowering said setter, said circuit being opened when said raising and lowering means is being operated.

JOSEPH W. BISHOP.